United States Patent [19]

Dorner et al.

[11] Patent Number: 5,046,566

[45] Date of Patent: Sep. 10, 1991

[54] PORTABLE HANDHELD TOOL HAVING A HANDLE ARRANGEMENT DECOUPLED BY ANTIVIBRATION ELEMENTS

[75] Inventors: Wolfgang Dorner, Rottenburg; Helmut Lux, Bittenfeld; Klaus Höppner, Marbach; Hermann Weiss, Steinheim; Georg Leppla, Waiblingen, all of Fed. Rep. of Germany

[73] Assignee: Andreas Stihl, Waiblingen, Fed. Rep. of Germany

[21] Appl. No.: 493,772

[22] Filed: Mar. 15, 1990

[30] Foreign Application Priority Data

Mar. 18, 1989 [DE] Fed. Rep. of Germany ....... 3908947
Jan. 27, 1990 [DE] Fed. Rep. of Germany ....... 4002459

[51] Int. Cl.⁵ ............................................. B27B 17/02
[52] U.S. Cl. ................................ 173/162.002; 30/381
[58] Field of Search ................ 173/162.1, 162.2; 30/381, 382, 383, 384, 385, 386

[56] References Cited

U.S. PATENT DOCUMENTS

| | | | |
|---|---|---|---|
| 3,849,883 | 11/1974 | Kolorz | 30/381 |
| 3,945,119 | 3/1976 | Nagashima et al. | 30/383 |
| 4,010,544 | 5/1977 | Siman | 30/381 |
| 4,138,812 | 2/1979 | Zimmerer et al. | 30/381 |
| 4,202,096 | 5/1980 | Nagashima | 30/381 |
| 4,694,578 | 9/1987 | Kemmler | 30/383 |

Primary Examiner—Frank T. Yost
Assistant Examiner—Scott A. Smith
Attorney, Agent, or Firm—Walter Ottesen

[57] ABSTRACT

The invention relates to a portable handheld tool such as a motor chain saw, cutoff machine or the like having a motor arranged in a housing. The motor drives a work tool via a drive pinion. The portable, handheld tool is provided with a handle arrangement for holding and guiding the tool with the handle arangement being decoupled from the motor system by antivibration elements. Soft antivibration elements are required to obtain high isolation; whereas, the antivibration elements have to be as stiff as possible in order to reliably guide and hold the handheld tool. The antivibration elements holding the handle arrangement on the side of the drive pinion are arranged to lie approximately in a common plane. This arrangement makes it possible to use softer antivibration elements without the required stiffness for guiding and holding becoming too low.

19 Claims, 4 Drawing Sheets

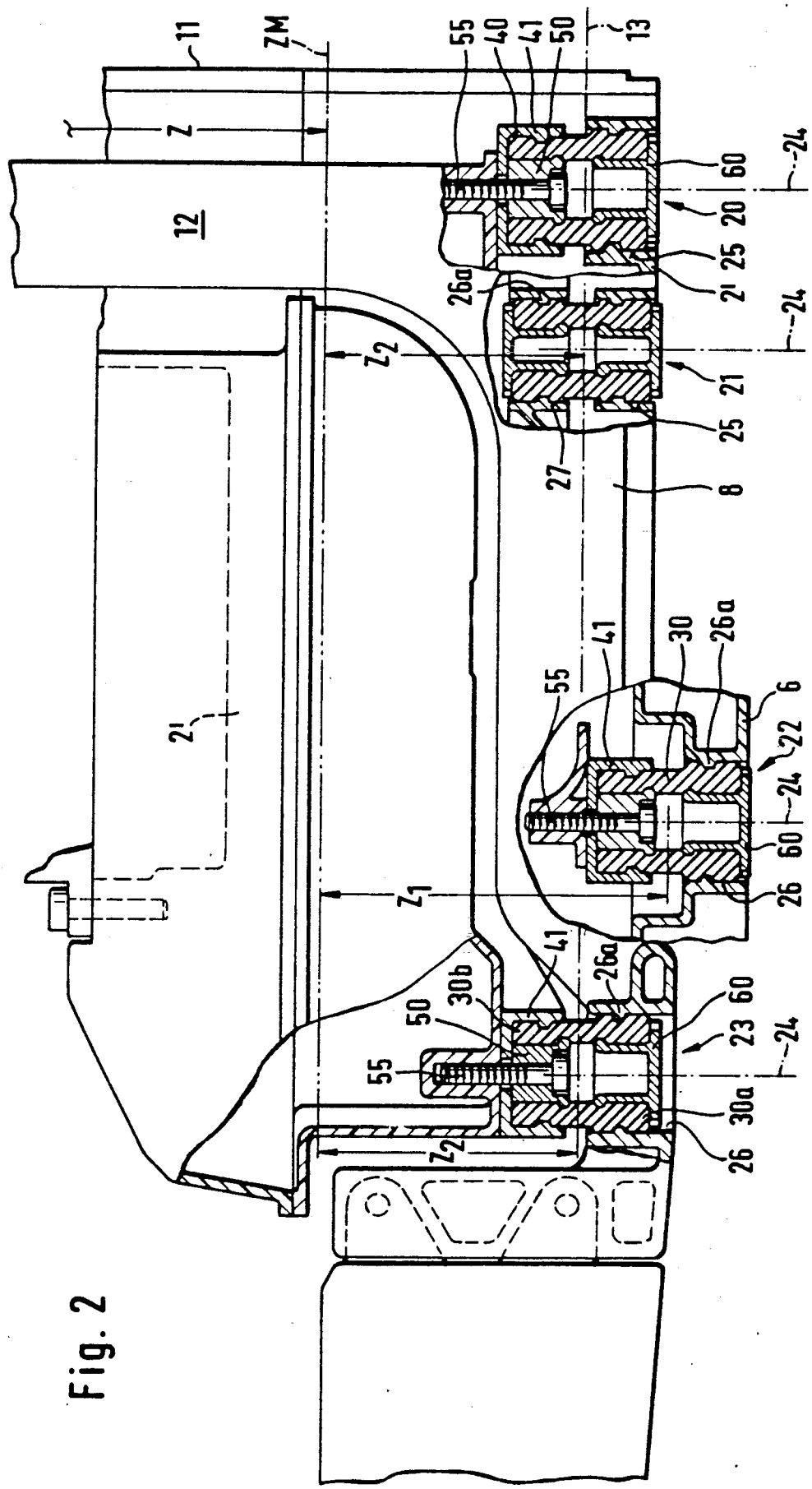

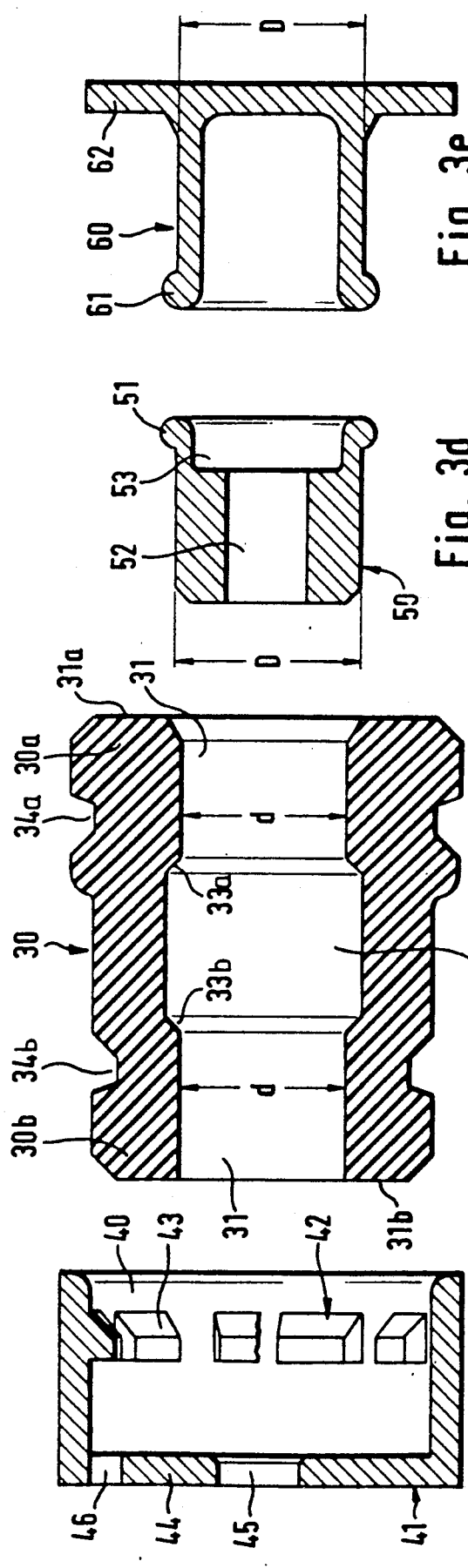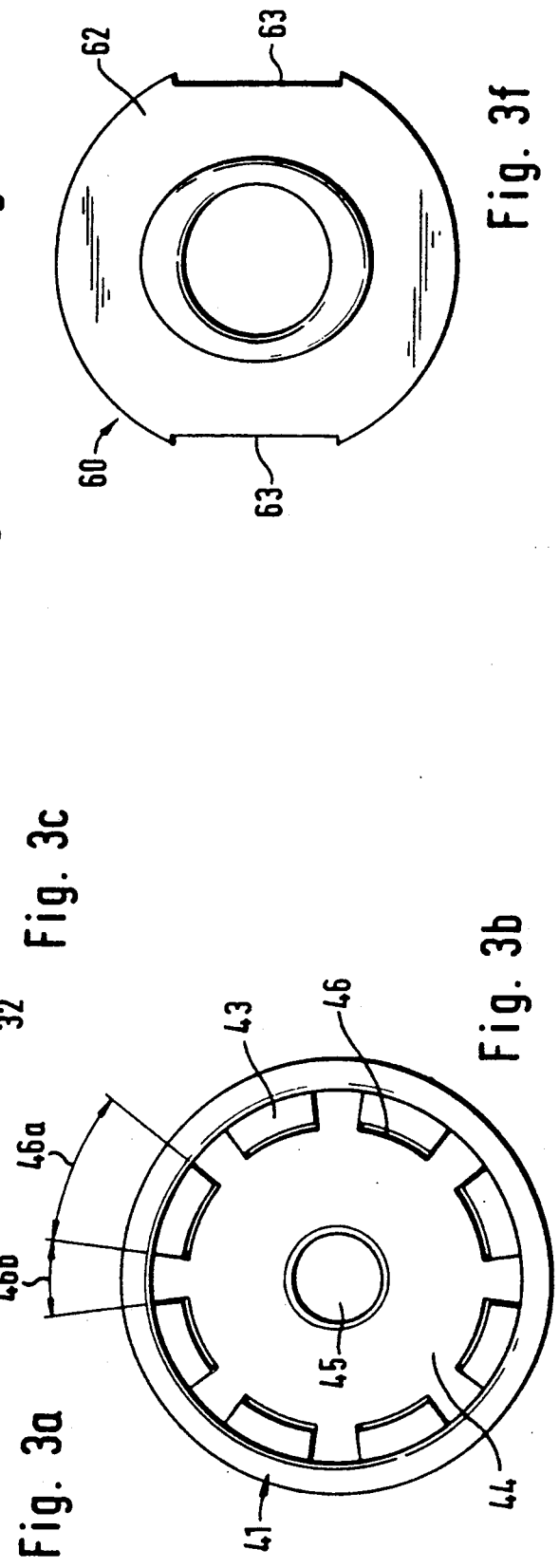

PORTABLE HANDHELD TOOL HAVING A HANDLE ARRANGEMENT DECOUPLED BY ANTIVIBRATION ELEMENTS

FIELD OF THE INVENTION

The invention relates to a portable handheld tool such as a motor chain saw, cutoff machine or the like having a drive motor arranged in a housing. The drive motor drives a work tool via a drive pinion. The portable handheld tool also has a handle arrangement for holding and guiding the tool with the handle arrangement being held to the motor via antivibration elements.

BACKGROUND OF THE INVENTION

Matching the stiffness of the antivibration elements is in practice relatively complex and difficult. On the one hand, the antivibration elements should be as soft as possible in order to obtain a good isolation of the vibrations of the motor system with respect to the handle arrangement. On the other hand, the antivibration elements must be configured to be so stiff that they reliably transmit the thrust and cutting forces and that the tool with the handle arrangement can be reliably held and guided. Up until now, it has not been possible for persons working in the field to optimally fulfill both requirements in the same manner. When matching the antivibration elements, it has been therefore necessary to accept compromises which, on the one hand, assure a substantially reliable guiding of the tool and, on the other hand, hold the vibrations transmitted from the motor system to the handle arrangement within tolerable magnitudes for the user.

SUMMARY OF THE INVENTION

It is an object of the invention to improve tools of the kind described above so that a more intense isolation between the motor system and the handle arrangement is possible with an increase of the guide qualities by means of the handle arrangement.

The portable, handheld tool of the invention can be a motor chain saw, cutoff machine or the like. The portable handheld tool of the invention has a work tool and includes: a housing; an engine having an output drive member for driving the work tool; the engine having a cylinder defining a cylinder plane and being mounted in the housing; the engine having a first side on which the drive member is disposed and a second side facing away from the first side; a handle arrangement for holding and guiding the handheld tool during operation thereof; a plurality of antivibration elements for mounting the handle arrangement on the engine; at least a first one of the antivibration elements being mounted on the second side of the engine at a predetermined first distance to the cylinder plane and the remainder of the antivibration elements being mounted on the first side of the engine at respective predetermined second distances to the cylinder plane; the product of the stiffness of the first antivibration element and the first distance being a first product; the product of the stiffness of each one of the remaining ones of the antivibration elements and the second distance corresponding thereto being a plurality of second products; and, the sum of the second products being very much greater than the first product.

It has been shown that the stiffness essential for the guiding characteristics of the tool are significantly increased and increased isolation is obtained with the arrangement of the antivibration elements according to the invention. Accordingly, it could be observed that the stiffness of the overall arrangement with respect to torsion about the guide bar is significantly increased by means of the arrangement of the invention of the antivibration elements. The reason for the foregoing is apparently that the antivibration elements are essentially loaded in tension and pressure in response to this load. The stiffness ratios of compression-tension to shear lie in the range of approximately 1:1 to 2:1.

In the arrangement according to the invention, the antivibration elements at the side of the drive pinion can therefore be softer antivibration elements with a simultaneous increase of the guiding stiffness. With the arrangement of the antivibration elements according to the invention, a stronger decoupling of the handle arrangement from the motor system can be arrived at so that the vibrations in the handle arrangement which are uncomfortable to the user can be reduced further. If all antivibration elements are on the same side of the motor as is the center of gravity of the latter, that is on the side of the drive pinion, then fewer vibrations are present on this side than on the opposite-lying side of the motor because of the subtraction of translatory and rotary vibrations.

In a preferred embodiment of the invention, the antivibration elements lie in approximately a common plane near the line along which force is applied.

BRIEF DESCRIPTION OF THE DRAWINGS

The invention will now be described with reference to the drawings wherein:

FIG. 2 is a plan view of the tool of FIG. 1 with portions of the housing broken away to show views of the lower and upper antivibration elements, in section, at their respective elevations;

FIG. 3a is a section view of a cap for holding an antivibration element;

FIG. 3b is a front view of the cap of FIG. 3a;

FIG. 3c is a side elevation view, in section, of a base body of an antivibration element according to one embodiment of the invention;

FIG. 3d is a section view of a plug for pressing one end of the base body into the cap;

FIG. 3e is a section view of a further plug;

FIG. 3f is a front view of the plug of FIG. 3e;

FIG. 4b is a section view of the base body of an antivibration element according to the second embodiment of the invention; and, FIG. 4c is a section view taken through a plug in the same manner as in FIG. 4a.

DESCRIPTION OF THE PREFERRED EMBODIMENTS OF THE INVENTION

Figure 1:
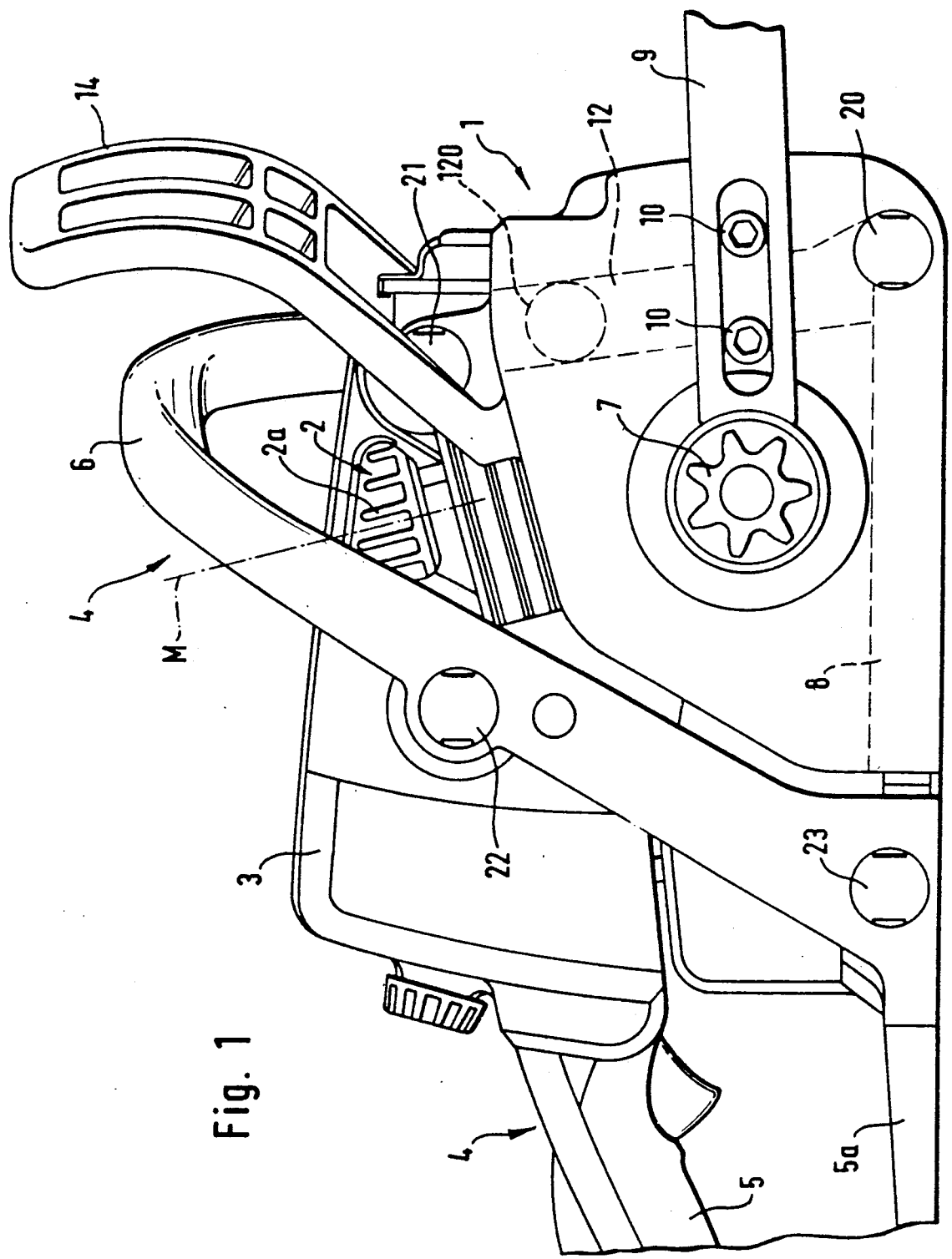
FIG. 1 is a side elevation view of a motor-driven, portable, handheld tool having the arrangement of the antivibration elements according to the invention.

The tool shown in FIGS. 1 and 2 is a motor chain saw 1 and includes an internal combustion engine 2 as the driving unit. The engine 2 drives a saw chain (not shown) via a drive sprocket 7 for movement about the guide bar 9. The guide bar 9 is fixed to the motor chain saw 1 by threaded bolts 10. The engine 2 is disposed within a housing 3 which has a handle 5 on the rearward end facing away from the guide bar 9. This rearward handle 5 and a forward handle 6 conjointly define a handle arrangement 4 by means of which the tool is held and guided.

The rearward handle 5 lies approximately in the plane determined by the guide bar 9. The base part 5a of the rearward handle 5 connects to a lateral lower strut 8 which is cantilevered toward the front 11 of the housing and lies beneath the housing 3 on the side of the drive sprocket 7. The strut 8 extends at the front 11 into a forward lower strut 12 which runs approximately parallel to the housing front at the housing base and extends to the side of the tool 1 facing away from the drive sprocket 7. The strut extends on this side, at a spacing to the housing, slightly inclined toward the rear and upwardly and forms the forward or bale handle 6 extending over the engine. The forward handle 6 connects to the lower strut 8 in the region of the base part 5a of the rearward handle 5. The bale handle 6 and the struts thereby conjointly define a closed structure wherein the tool 1 is mounted.

The handle arrangement 4 is connected to the engine 2 and engine system via antivibration elements (20, 21, 22, 23, 120). Most of the antivibration elements which connect the handle arrangement 4 to the engine system lie on the side of the tool 1 at which the sprocket 7 is also disposed. As can be seen especially in FIG. 2, the antivibration elements (20, 21, 22, 23) lie approximately in a common plane 13 with this plane being parallel to the plane defined by the drive sprocket 7. The antivibration elements (20, 21, 22, 23) preferably lie in the plane of the drive sprocket 7.

The term "lying in a plane" is intended to emphasize that the plane 13 intersects or touches the antivibration elements 20 in such a manner that the axes 24 of the antivibration elements (20 to 23) are disposed so that they are perpendicular to the plane 13.

The antivibration elements lie as closely as possible to the line along which force is applied and this line is determined by the guide bar 9. In the embodiment shown, two antivibration elements (20, 23) lie beneath and two antivibration elements (21, 22) lie above the line.

In the embodiment shown, the two antivibration elements (20 and 23) lie at the elevation of the lower lateral handle strut 8. In this connection, the antivibration element 20 is arranged at the forward end of the strut 8 beneath the threaded bolts 10 and the antivibration element 23 is arranged at the rearward end next to the base part 5a of the rearward handle 5.

The additional antivibration element 22 is provided in the region of the forward handle 6 in such a manner that it lies on the mid-length between the uppermost region of the forward handle 6 and the base part 5a of the rearward handle 5. The fourth antivibration element 21 connects the housing 3 to the engine system and to the engine 2 with the housing 3 extending into the rearward handle 5. This antivibration element 21 lies in the foot region of a hand protector 14 approximately above the threaded bolts 10. This hand protector 14 is positioned in front of the forward handle 6.

The antivibration elements (20, 22, 23) all have the same configuration and comprise a base body 30 in the form of a tubular section which is formed of elastic material such as rubber or the like (FIG. 3c). This base body 30 has a central, cylindrical opening 31 which is expanded in diameter in a central section 32. In this way, annular shoulders (33a, 33b) are formed at the two axial ends, respectively, of the center section 32.

Peripheral slots (34a, 34b) are formed in the outer periphery of the base body 30 with an axial spacing to the corresponding end face (31a, 31b) of the corresponding axial end (30a, 30b). The end 30a is configured to have a larger outer diameter than the end 30b. The distance of the peripheral slots (34a, 34b) to the end faces (31a, 31b) corresponding thereto is approximately equal. The spacing of the annular shoulders (33a, 33b) to the corresponding ones of the end faces (31a, 31b) is greater than the distance of the peripheral slots (34a, 34b) to the respective end faces (31a, 31b) as shown in FIG. 3c.

A cup-shaped cap 41 (FIG. 3a) corresponds to the end 30b and defines a seat 40 for receiving the end 30b therein. The outer diameter of the end 30b corresponds approximately to the inner diameter of the seat 40.

A ring-shaped attachment projection 42 is provided on the inner wall of the seat 40 and is formed of ring flange segments 43 lying one spaced from the other in the peripheral direction. The ring flange segments 43 all have approximately the same length and are all at the same distance from each other in the peripheral direction. To facilitate pressing the base body 30 into the seat 40, the end 30b is provided with a chamfer (FIG. 3c) while the surface sections of the flange segments 43 are inclined as shown in FIG. 3a. In contrast, the sides of the ring flange segments 43 axially facing toward the base 44 lie in a plane to which the axis of the cap 41 is perpendicular.

After pressing the end 30b into the seat 40, a plug 50 (FIG. 3d) is pressed in from the end face 31a into the cylindrical opening 31 until it is in contact engagement with the base 44 of the cap 41. As shown in FIG. 2, in this position, a ring-shaped outer bead 51 of the plug 50 lies against the ring shoulder 33b to prevent the plug 50 from being pressed in too deeply. The outer diameter D of the plug 50 is larger than the inner diameter (d) of the cylindrical opening 31 so that the end 30b of the elastic base body 30 is pressed radially into the seat 40. In this way, a filled-in or volumetric clamping is obtained which assures a reliable fit of the end 30b in the seat 40 of the cap 41. In this context, it is advantageous that the attachment projection 42 is not configured so as to be continuous in the peripheral direction so that the material of the elastic base body 30 can also press into the spaces between the individual ring flange segments 43.

As shown in the front view of the cap 41 (FIG. 3b), ring-segment breakthroughs 46 are provided in the peripheral region of the base 44 which each extend over an angle 46a of approximately 30°. The breakthroughs 46 each have a spacing one from the other which extends over an angle 46b of approximately 15°.

The plug 50 (FIG. 3d) has a central bore 52 which aligns with a corresponding central opening 45 in the base 44 of the cap 41. In this manner, an attachment bolt 55 can be inserted at the end face 31a so as to extend through the plug 50 and the cap 41 to clamp end 30b of the base body 30 to a first part, the end 30b being volumetrically clamped in the cap 41. A corresponding recess 53 (FIG. 3d) is provided in the plug 50 for receiving the head of the bolt 55 as shown in FIG. 2.

As shown in FIG. 2, the antivibration element 23 is fixed with its one end 30b to the motor system 2' by means of the attachment bolt 55. With its other end 30a, the base body 30 of the antivibration element lies in a seat 26 of the handle strut 8. An attachment bead 26a is provided within the seat 26 and is formed as one piece with the wall of the seat 26. The attachment bead projects radially into the seat and engages in the outer slot 34a of the base body 30. The plug 60 is also radially clamped by pressing the plug 60 into the central opening 31 at the end 30a and is thereby held tightly in the seat 26. For this purpose, the plug 60 has an outer diameter D which is greater than the inner diameter (d) of the central opening 31.

At its inner end, the plug 60 has a continuous annular bead 61 which engages behind the annular shoulder 33a when the plug 60 is pressed into the base body 30. In this way, the annular shoulder 33a holds the plug axially so that it cannot be lost. The plug 60 is formed as a single piece with a flange cover 62 at its end lying opposite the outer bead 61. The cover 62 is provided for covering the end face 31a of the base body 30. The length of the plug 60 is so selected that the cover 62 lies against the end face 31a when the outer bead 61 engages behind the annular shoulder 33a.

As shown in FIG. 3f, the cover 62 is provided with flats 63 at diametrically opposite sides thereof.

The antivibration element 22 is, on the one hand, fixed to another part of the engine system 2' via the attachment bolt 55 and, on the other hand, to a recess 26 of the forward handle 6.

The antivibration element 20 is configured identically with the attachment bolt 55 being threadably engaged in the forward lower strut 12. The other end of the base body 30 is clamped in a recess 25 of the engine system 2'.

Figure 4C:
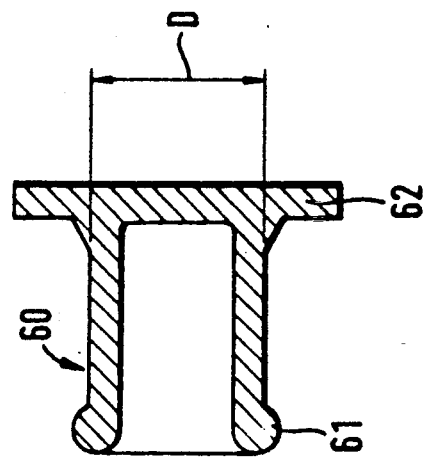
Figure 4B:
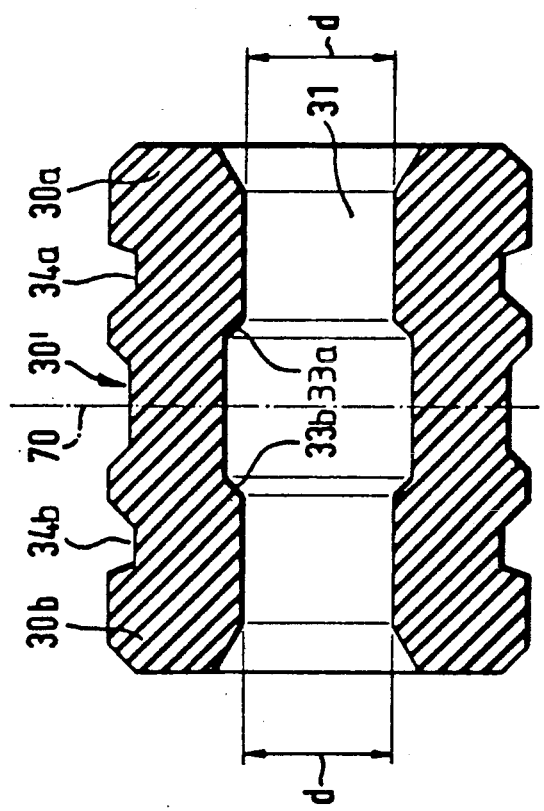
Figure 4A:
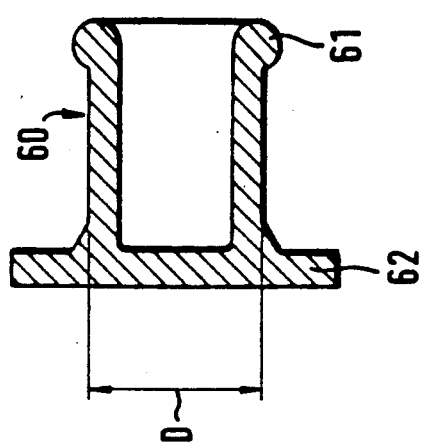
FIG. 4a is a section view through a plug for an antivibration element according a second embodiment.

The antivibration element 21 is illustrated with respect to its individual parts in FIGS. 4a to 4c. The base body 30' is configured so as to be symmetrical to a radial center plane 70 with both ends corresponding to the end 30b of base body 30 (FIG. 3c). In the same manner, inner annular shoulders (33a, 33b) and outer peripheral slots (34a, 34b) are provided. In both ends (30a, 30b), plugs 60 are pressed in which correspond with respect to their shape and their dimensions to the plug shown in FIG. 3e.

The antivibration element 21 is fixed with one end in a seat 25 of the housing 2 and, with its other end, in a seat 27 of the engine system 2'. Attachment projections 26a arranged in the seats (25 and 27) engage in corresponding peripheral slots (34a, 34b).

In addition to the antivibration elements (20, 21, 22, 23) mounted on the side of the drive sprocket 7, an antivibration element 120 (FIG. 1) can be mounted on the side of the engine facing away from the drive sprocket 7 which connects the handle arrangement to the engine 2. In an arrangement of this kind, the stiffnesses as well as the positions of the antivibration elements with respect to the center M of the cylinder 2a are selected so that the relationship:

$$\Sigma|C_L \cdot Z_L| << \Sigma|C_R \cdot Z_R|$$

is satisfied. The following is especially applicable:

$$\frac{\Sigma|C_L \cdot Z_L|}{\Sigma|C_R \cdot Z_R|} \leq 0.2$$

wherein $C_R$ is the spring stiffness of an antivibration element (20, 21, 22, 23) on the side of the drive sprocket 7 and $Z_R$ is the distance ($Z_1$ or $Z_2$) of the antivibration element to the cylinder center plane ZM. $C_L$ is the spring stiffness of the antivibration element 120 disposed at the side of the engine facing away from the drive sprocket 7 and $Z_L$ is the distance C of antivibration element 120 to the cylinder center plane ZM. The spacing is measured in the direction of the crankshaft. Based on the embodiment shown, the equation is then:

$$\frac{|C_{AV120} \cdot Z|}{|C_{AV20} \cdot Z_2| + |C_{AV21} \cdot Z_2| + |C_{AV22} \cdot Z_1| + |C_{AV23} \cdot Z_2|} \leq 0.2$$

If all antivibration elements are arranged on the side of the drive sprocket 7, then the product $C_L \cdot Z_L = 0$ so that the condition:

$$|C_L \cdot Z_L| << \Sigma|C_R \cdot Z_R|$$

is satisfied. The cylinder center plane ZM contains the cylinder axis M (FIG. 1) and corresponds to the plane conjointly defined by the coordinate axes x and y. The x-coordinate extends parallelly to the guide bar while the y-axis extends vertically. The z-axis lies in the direction of the crankshaft axis. The distances of the antivibration elements are then measured in the z-direction and provide the spacing to the cylinder center plane ZM.

By arranging the antivibration elements essentially on the drive side of the tool, the antivibration elements can be arranged approximately in a plane defined by the work tool, which in this embodiment of a chain saw is the guide bar 9. The spacing of the antivibration elements in the chain saw perpendicular can, in this arrangement, be made very large. In this way, guiding torques about the axis of the guide bar can be taken up by the antivibration elements in the compression-tension direction. In addition, forces of the work tool effect only slight torques about the vertical and longitudinal axes. In the thrust direction, only the thrust forces must be taken up. The ratio of the stiffnesses for antivibration elements of this kind for compression-tension to shear lies in the range of approximately 1:1 to 2:1. Because of this condition, the magnitudes of the stiffnesses can be selected so as to be smaller and this works out to be favorable to the vibration isolation. The base bodies are relatively stiff in the axial direction even with very soft rubber mixtures so that softer rubber mixtures can be utilized when increasing the guiding stiffness because of the arrangement of the antivibration elements (20 to 23) whereby a better decoupling of the handle arrangement 4 from the engine 2 and the engine system is obtained.

It is understood that the foregoing description is that of the preferred embodiments of the invention and that various changes and modifications may be made thereto without departing from the spirit and scope of the invention as defined in the appended claims.

What is claimed is:

1. A portable, handheld tool such as a motor chain saw, cutoff machine or the like, the portable handheld tool having a work tool and comprising:
   a housing;
   an engine having an output drive member for driving the work tool; said drive member defining a plane;
   said engine having a cylinder defining a cylinder axis lying in a vertical cylinder plane and being mounted in said housing; said plane of said drive member and said cylinder plane being substantially parallel;
   said engine having a first side with respect to said cylinder plane on which said drive member is disposed and a second side with respect to said cylinder plane facing away from said first side;

a handle arrangement for holding and guiding the handheld tool during operation thereof;

a plurality of antivibration elements for mounting the handle arrangement on said engine;

a first one of said antivibration elements being mounted on said second side of said engine at a predetermined first distance to said cylinder plane and the remainder of said antivibration elements being mounted on said first side of said engine at respective predetermined second distances to said cylinder plane;

the product of the stiffness of said first antivibration element and said first distance being a first product; the product of the stiffness of each one of said remaining ones of said antivibration elements and the second distance corresponding thereto being a plurality of second products; and, the sum of said second products being very much greater than said first product.

2. The portable handheld tool of claim 1, said first product being less than said sum of said products by an amount corresponding to less than twenty percent.

3. The portable handheld tool of claim 1, said remaining ones of said antivibration elements lying approximately in a common plane.

4. The portable handheld tool of claim 3, said plane of said drive member and said common plane being substantially parallel.

5. The portable handheld tool of claim 3, said common plane and said plane of said drive member being coincident.

6. The portable handheld tool of claim 1, further comprising an engine system including said engine; and, each of said antivibration elements including: a first seat disposed on said engine system; a second seat disposed on said handle arrangement; and, a tube-like base body having first and second end portions volumetrically clamped in respective ones of said first and second seats.

7. The portable handheld tool of claim 6, said seats each having an attachment projection formed therein and said end portions having first and second peripheral slots formed therein, respectively, for receiving the attachment projection of the seat corresponding thereto.

8. The portable handheld tool of claim 7, said base body defining a longitudinal axis and having two longitudinal end faces, said base body further having a through bore extending along said axis and having first and second annular shoulders formed in said through bore; said first and second peripheral slots formed in respective ones of said end portions being disposed at a first spacing away from the end face closest thereto with said first spacing being measured along said axis; and, each of said shoulders being disposed away from the end face closest thereto at a second spacing along said axis with said second spacing being greater than said first spacing.

9. The portable handheld tool of claim 8, said bore having a first diameter and having a center portion expanded to have a second diameter greater than said first diameter to form said first and second shoulders.

10. The portable handheld tool of claim 8, said through bore having a first diameter (d) and the antivibration element further including a plug having a second diameter (D) greater than said first diameter (d); and, said plug having an outer bead formed thereon for coming into contact engagement with one of said annular shoulders when said plug is inserted into said bore.

11. The portable handheld tool of claim 10, said plug being a first plug and being inserted into said base body so as to be disposed at a first longitudinal end thereof; and, the antivibration element further including: a second plug inserted into said base body so as to be disposed at a second longitudinal end thereof; and, said second plug having a cover formed thereon so as to be in contact engagement with the end face of said base body corresponding to said second longitudinal end thereof.

12. The portable handheld tool of claim 11, said base body having a diameter and said cover having a diameter corresponding to said diameter of said base body; and, said cover having two flats formed thereon so as to lie directly opposite each other.

13. The portable handheld tool of claim 10, said plug having a plug bore formed therein and being seated completely within said bore of said base body; one of said seats being a cap having a base wall defining a central cap bore aligned with said plug bore; and, said antivibration element further including a threaded fastener extending through said bores so as to extend beyond said base wall of said cap to fasten said antivibration element to one of said engine system and said handle arrangement.

14. The portable handheld tool of claim 13, said cap having a plurality of ring-segment breakthroughs formed in said base wall so as to extend about the periphery thereof one next to the other.

15. The portable handheld tool of claim 14, each one of said ring-segment breakthroughs extending over an arc of 30°.

16. The portable handheld tool of claim 13, said cap having a side wall extending upwardly from said base wall with said side wall defining an inner wall surface; and, said attachment projection comprising a plurality of ring flange segments formed on said side wall so as to extend therealong one next to the other.

17. The portable handheld tool of claim 16, said ring flange segments all having the same length.

18. The portable handheld tool of claim 6, said base body defining a longitudinal axis and having respective longitudinal end faces; and, said base body being configured so as to be symmetrical with respect to a central plane perpendicular to said axis.

19. The portable handheld tool of claim 6, said bore having respective ends and being configured so as to expand conically at said ends into respective ones of said end faces.

* * * * *